US007924733B2

(12) United States Patent
Adhikari et al.

(10) Patent No.: US 7,924,733 B2
(45) Date of Patent: Apr. 12, 2011

(54) ROOT CAUSE ANALYSIS OF NETWORK PERFORMANCE BASED ON EXCULPATION OR INCULPATION SETS

(75) Inventors: Akshay Adhikari, Bernardsville, NJ (US); Lorraine Denby, Berkeley Heights, NJ (US); Colin L. Mallows, Flemington, NJ (US); Jean Meloche, Madison, NJ (US); Balaji Rao, Somerville, NJ (US)

(73) Assignee: Avaya Inc., Basking Ridge, NJ (US)

( * ) Notice: Subject to any disclaimer, the term of this patent is extended or adjusted under 35 U.S.C. 154(b) by 698 days.

(21) Appl. No.: 11/536,229

(22) Filed: Sep. 28, 2006

(65) Prior Publication Data

US 2008/0080376 A1    Apr. 3, 2008

(51) Int. Cl.
    *H04J 1/16* (2006.01)
(52) U.S. Cl. ........................................................ 370/252
(58) Field of Classification Search .......... 370/231–233, 370/241–253, 464, 480, 485, 486, 487, 489, 370/490
    See application file for complete search history.

(56) References Cited

U.S. PATENT DOCUMENTS

| | | | | |
|---|---|---|---|---|
| 6,307,841 | B1* | 10/2001 | Rowles et al. | 370/252 |
| 7,031,264 | B2 | 4/2006 | Adhikari et al. | |
| 7,403,988 | B1* | 7/2008 | Blouin et al. | 709/223 |
| 2002/0111158 | A1* | 8/2002 | Tee | 455/421 |
| 2003/0086425 | A1 | 5/2003 | Bearden et al. | |
| 2003/0091165 | A1 | 5/2003 | Bearden et al. | |
| 2003/0097438 | A1 | 5/2003 | Bearden et al. | |
| 2003/0126255 | A1* | 7/2003 | Rice et al. | 709/224 |
| 2004/0030924 | A1* | 2/2004 | Griswold | 713/201 |
| 2004/0062204 | A1 | 4/2004 | Bearden et al. | |
| 2004/0252694 | A1 | 12/2004 | Adhikari et al. | |
| 2005/0053009 | A1* | 3/2005 | Denby et al. | 370/250 |
| 2005/0207410 | A1 | 9/2005 | Adhikari et al. | |
| 2006/0140132 | A1* | 6/2006 | Lee et al. | 370/248 |
| 2006/0153083 | A1* | 7/2006 | Wallenius | 370/241 |
| 2007/0054682 | A1* | 3/2007 | Fanning et al. | 455/509 |

OTHER PUBLICATIONS

U.S. Appl. No. 11/531,910, filed Sep. 14, 2006, L. Denby et al., "Data Compression in a Distributed Monitoring System."
U.S. Appl. No. 11/496,360, filed Jul. 31, 2006, B. Karacali-Akyamac et al., "Determination of Endpoint Device Location for Efficient Analysis of Network Performance."

(Continued)

*Primary Examiner* — Kwang B Yao
*Assistant Examiner* — Obaidul Huq
(74) *Attorney, Agent, or Firm* — Joseph B. Ryan; Jason Paul DeMont; Wayne S. Breyer (57) ABSTRACT

Performance problems or other conditions are analyzed in a system comprising a plurality of endpoint devices and an associated centralized or distributed controller. End-to-end measurements are obtained for respective paths through the network, for example, using communications between the endpoint devices. For a given end-to-end measurement obtained for a particular one of the paths, a value of a performance indicator for the path is determined and the performance indicator value is assigned to each of a plurality of links of the path. The determining and assigning operations are repeated for additional ones of the end-to-end measurements, the links are grouped into one or more exculpation or inculpation sets based on how many times a particular performance indicator value has been assigned to each of the links, and the one or more sets are utilized to determine, for example, the location of a performance problem in the network.

21 Claims, 2 Drawing Sheets

OTHER PUBLICATIONS

B. Karacali et al., "Scalable Network Assessment for IP Telephony," Proceedings of the 2004 IEEE International Conference on Communications (ICC-04), pp. 1-14, 2004.

"Avaya ExpertNet™ Lite Assessment Tool," White Paper, 10 pages, Apr. 2005.

"Avaya ExpertNet™ VoIP Assessment Tool," White Paper, 13 pages, Sep. 2005.

C. Tang et al., "On the Cost-Quality Tradeoff in Topology-Aware Overlay Path Probing," Proceedings of the 11th IEEE Conference on Network Protocols (ICNP), 12 pages, Nov. 2003.

R. Kumar et al., "Efficient Beacon Placement for Network Tomography," IMC '04, Proceedings of the 4th ACM SIGCOMM Conference on Internet Measurement, ACM Press, 6 pages, Oct. 2004.

Y. Chen et al., "An Algebraic Approach to Practical and Scalable Overlay Network Monitoring," SIGCOMM '04, Proceedings of the 2004 Conference on Applications, Technologies, Architectures, and Protocols for Computer Communications, ACM Press, pp. 1-12, Aug.-Sep. 2004.

Y. Shavitt et al., "Computing the Unmeasured: An Algebraic Approach to Internet Mapping," IEEE Journal on Selected Areas in Communications, vol. 22, No. 1, pp. 67-78, Jan. 2004.

J.D. Horton et al., "On the Number of Distributed Measurement Points for Network Tomography," IMC '03, Proceedings of the 3rd ACM SIGCOMM Conference on Internet Measurement, ACM Press, 6 pages, Oct. 2003.

S. Jamin et al., "On the Placement of Internet Instrumentation," Proceedings of the IEEE Infocom 2000, 10 pages, 2000.

Moshe Sidi, "Reality-based VoIP Readiness Testing using NetAlly® VoIP," Viola Networks, pp. 1-10, Apr. 2002.

Moshe Sidi, "Readying Your Network for VoIP: Get it Right the First Time," Viola Networks, pp. 1-9, Apr. 2002.

J.Q. Walker, "A Handbook for Successful VoIP Deployment: Network Testing, QoS, and More," NetIQ Corporation, pp. 1-13, 2002.

Y. Breitbart et al., "Topology Discovery in Heterogeneous IP Networks," Proceedings of IEEE Infocom 2000, 10 pages, Mar. 2000.

B. Huffaker et al., "Topology Discovery by Active Probing," CAIDA, 8 pages, 2002.

M.R. Meiss et al., "Standards-Based Discovery of Switched Ethernet Topology," Advanced Network Management Lab, pp. 1-20, Apr. 2002.

R. Siamwalla et al., "Discovering Internet Topology," Cornell University, pp. 1-16, Jul. 1998.

C. Perkins et al., "RTP Testing Strategies," Network Working Group, RFC 3158, pp. 1-21, Aug. 2001.

* cited by examiner

ROOT CAUSE ANALYSIS OF NETWORK PERFORMANCE BASED ON EXCULPATION OR INCULPATION SETS

FIELD OF THE INVENTION

The invention relates generally to techniques for determining locations or other causes associated with performance problems or other conditions in a network. Such techniques may be implemented in network monitoring and analysis systems for the monitoring and analysis of Voice over Internet Protocol (VoIP) communications, multimedia communications or other types of network traffic.

BACKGROUND OF THE INVENTION

Recent trends in the telecommunications industry towards unified communications emphasize the need for converged networks to deliver acceptable quality of service (QoS) for different types of applications with varying QoS needs. Multimedia applications such as Internet telephony are among the end-to-end applications which demand strict QoS guarantees from the underlying data network. Understanding the network behavior at all stages of the deployment of such applications is critical for their performance. For example, at the pre-deployment stage, it is necessary to assess whether the network can deliver the required QoS and more importantly which parts of the network fail to do so. After deployment, monitoring the performance of the network is necessary for maintaining acceptable QoS levels.

Conventional network monitoring and analysis systems are generally not configured to provide an adequate mechanism for understanding link-level QoS behavior in a network. Such information is particularly useful for the purpose of locating the sources of performance problems in a network, but is also useful for many other purposes.

U.S. Patent Application Publication No. 2005/0053009, entitled "Method and Apparatus for Automatic Determination of Performance Problem Locations in a Network," discloses techniques for automatically determining the particular locations associated with performance problems in a network comprising a plurality of endpoint devices. In one aspect, a network monitoring and analysis system is configured to include a root cause analysis function that permits the automatic determination of performance problem locations in the network. Test communications are generated in accordance with a selected pattern, and end-to-end path measurement data is collected utilizing the generated test communications. The test communications may be directed between pairs of the endpoint devices as specified in the selected pattern. The end-to-end path measurement data is transformed to produce performance indicators for respective non-end-to-end paths defined at least in part by the selected pattern. Such an approach advantageously provides a particularly efficient and accurate mechanism for generating link-level performance indicators in a network, thereby permitting a better understanding of QoS behavior in the network.

Despite the considerable advances provided by the techniques disclosed in the above-cited U.S. patent application, a need remains for farther improvements, particularly with regard to root cause analysis of network performance problems.

SUMMARY OF THE INVENTION

The present invention in one or more illustrative embodiments provides techniques for root cause analysis of network performance problems or other performance conditions.

In accordance with an aspect of the invention, performance problem locations or other causes of network performance conditions are determined in a system comprising a plurality of endpoint devices configured to communicate over a network. The system may also comprise a centralized or distributed controller associated with the endpoint devices. End-to-end measurements are obtained for respective paths through the network, for example, using communications between the endpoint devices. For a given end-to-end measurement obtained for a particular one of the paths, a value of a performance indicator for the path is determined and the performance indicator value is assigned to each of a plurality of links of the path. The performance indicator may comprise a binary indicator having a first value indicative of adequate performance and a second value indicative of inadequate performance.

The determining and assigning operations are repeated for additional ones of the end-to-end measurements, the links are grouped into one or more exculpation or inculpation sets based on how many times a particular performance indicator value has been assigned to each of the links, and the one or more exculpation or inculpation sets are utilized to determine the location of a performance problem in the network, or more generally the cause of a network performance condition in the network.

In an illustrative embodiment, a given link may be included in the exculpation set if the number of times a performance indicator value indicative of adequate performance has been assigned to the link exceeds a specified minimum number. As another example, a given link may be included in the exculpation set if at least a specified minimum percentage of the performance indicator values assigned to the link are indicative of adequate performance. Similarly, a given link may be included in the inculpation set if the number of times a performance indicator value indicative of inadequate performance has been assigned to the link exceeds a specified minimum number, or if at least a specified minimum percentage of the performance indicator values assigned to the link are indicative of inadequate performance.

The exculpation set alone, the inculpation set alone or a combination of the exculpation and inculpation sets may be used to determine the location of the performance problem in the network, or to perform other types of root cause analysis relating to network performance conditions. For example, one or more likely problem links may be identified from a complement of an exculpation set, or from the inculpation set, or from a combination of the inculpation set and the complement of the exculpation set.

In accordance with another aspect of the invention, a threshold used to control membership of a given link in the one or more sets may be determined by adjusting the threshold until the one or more sets have approximately a desired size. Also, the threshold used to control membership of a given link in the one or more sets may be adjusted and likely problem links may be ordered for further investigation based on an order in which the links enter or leave the set(s) with the adjustments in the threshold.

Advantageously, the present invention in the illustrative embodiments provides improved root cause analysis, thereby allowing system operators to more easily determine the particular sources of network performance problems or other performance conditions.

DETAILED DESCRIPTION OF THE INVENTION

The invention will be illustrated below in conjunction with an exemplary network-based communication system suitable for supporting Internet telephony applications. It should be understood, however, that the invention is not limited to use with any particular type of communication system or configuration of endpoint devices or other system elements. Those skilled in the art will recognize that the disclosed techniques may be used in any communication application in which it is desirable to provide improved root cause analysis of performance problems or other conditions in a network. For example, the invention applies to any system that attempts to relate end-to-end performance to network topology or to one or more particular network elements that impact the end-to-end performance.

Moreover, the invention, although particularly well-suited for use in monitoring and analysis of VoIP traffic, also provides significant advantages in multimedia traffic applications or other flow-based real-time applications in which it is desirable to understand link-level performance within the network.

The invention can thus be used with voice, video, multimedia or any other type of network traffic.

The term "packet" as used herein is intended to include not only IP packets but also other types of packets used in other packet-based communication systems.

The term "call" as used herein is intended to be construed broadly so as to encompass Internet telephony communications, VoIP communications, Session Initiation Protocol (SIP) communications, multimedia communications, or other types of network traffic.

The terms "endpoint" and "endpoint device" are used interchangeably herein and are intended to include an origination or destination device associated with a given VoIP call or other type of communication. Examples of such devices may also be referred to as monitoring devices, measurement devices, software agents, etc.

It is to be appreciated that a given endpoint device therefore need not be a terminal device of the system, and may comprise an internal network element such as, for example, a gateway, a router, a switch, or any other type of non-terminal network element. A given pair of endpoint devices in the illustrative embodiment may be viewed generally as comprising the source and destination nodes of a particular communication path. An endpoint device may therefore be a device comprising or otherwise associated with any network node.

The term "measurement data" as used herein is intended to include, for example, jitter, loss, delay or other QoS-related statistics, associated analysis results determinable therefrom, as well as other types of data.

Figure 1:
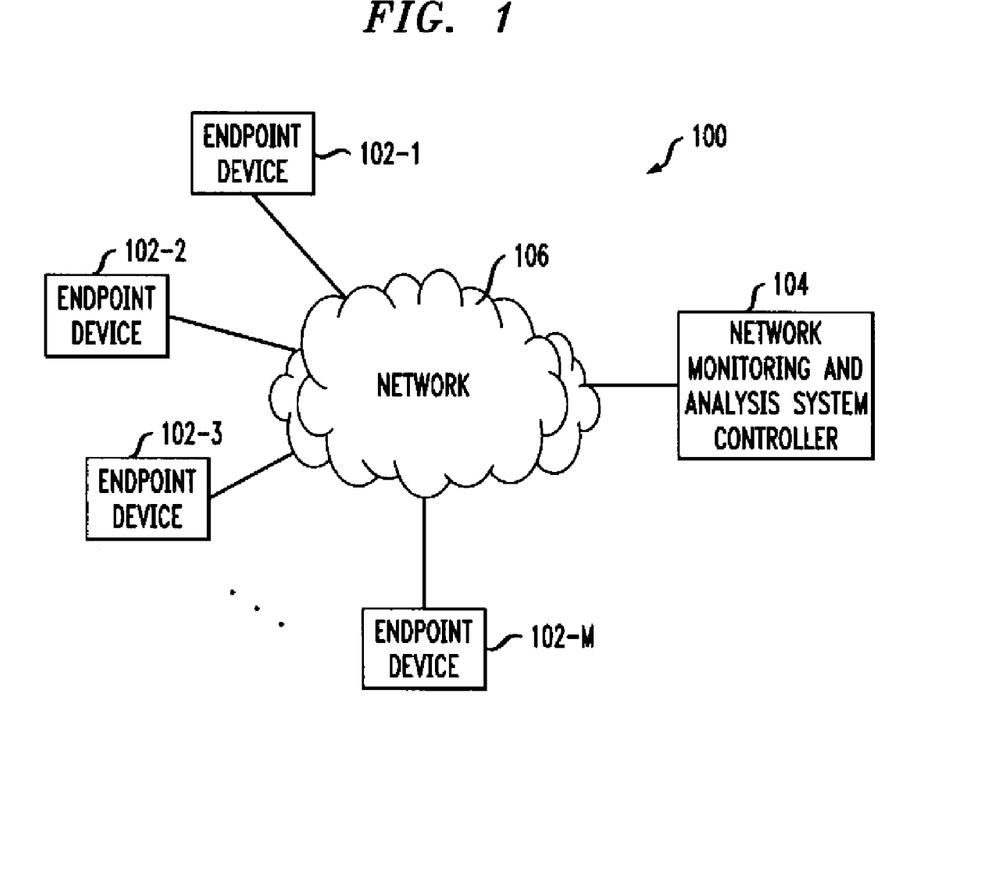
FIG. 1 shows an exemplary communication system in accordance with an illustrative embodiment of the invention.

FIG. 1 shows an example network-based communication system 100 in which the present invention is implemented. The system 100 includes an arbitrary number M of endpoint devices 102-$j$, $j$=1, 2, ... M, and a network monitoring and analysis system controller 104. Each of the endpoint devices 102 and the controller 104 is coupled to or otherwise associated with a network 106. It should be noted that the variable $j$ is used in a different sense in the context of FIG. 1 than elsewhere in the description.

Although shown for simplicity of illustration as terminal endpoint devices in the figure, one or more of the endpoint devices of the system, as indicated previously, may comprise or be otherwise associated with an internal node of network 106.

The particular locations of the endpoint devices 102 within the system 100 may be determined, for example, using techniques such as those disclosed in U.S. patent application Ser. No. 11/496,360, filed Jul. 31, 2006 and entitled "Determination of Endpoint Device Location for Efficient Analysis of Network Performance," which is incorporated by reference herein.

An illustrative embodiment of the invention as implemented in the network-based communication system 100 of FIG. 1 advantageously permits automated determination of the particular location(s) associated with one or more performance problems in the network 106. This function is generally referred to herein as "root cause analysis." Such a function may involve the use of techniques similar to those described in the above-cited U.S. Patent Application Publication No. 2005/0053009. The controller 104 may illustratively comprise an otherwise conventional controller of a network monitoring and analysis system, implemented in or otherwise utilized in conjunction with the system 100, suitably modified to include a root cause analysis function, as will be described in detail below.

It should be understood that the invention does not require the use of a network monitoring and analysis system, and may be implemented in a wide variety of systems involving monitoring or analysis, or other functions.

One example of a network monitoring and analysis system that may be configured to include a root cause analysis function in accordance with the invention is the ExpertNet™ network readiness assessment tool from Avaya Inc. of Basking Ridge, N.J., USA. The ExpertNet™ tool may be configured to collect various measurements from a network, including, by way of example, topology information, periodic traffic measurements from network devices via Simple Network Management Protocol (SNMP), and end-to-end performance measurements collected with the use of software agents installed at various endpoint devices or elsewhere in the network. The conventional aspects of this tool and other network monitoring and analysis systems are well-known in the art, and therefore will not be further described herein. Such systems may be implemented at least in part in the form of software running on a computer or other processing device associated with the controller 104.

Further aspects of network monitoring and analysis systems that may be utilized in conjunction with the invention are described in, for example, U.S. patent application Ser. No. 10/270,011, entitled "Report Generation and Visualization Systems and Methods and Their Use in Testing Frameworks for Determining Suitability of a Network for Target Applications," U.S. patent application Ser. No. 10/270,335, entitled "Network Topology Discovery Systems and Methods and Their Use in Testing Frameworks for Determining Suitability of a Network for Target Applications," and U.S. patent application Ser. No. 10/270,122, entitled "Network Traffic Generation and Monitoring Systems and Methods for Their Use in Testing Frameworks for Determining Suitability of a Network for Target Applications," all filed on Oct. 15, 2002, the disclosures of which are incorporated by reference herein.

Additional details regarding possible network monitoring and analysis system features that may be implemented in the system 100 are described in U.S. patent application Ser. No. 10/261,431, filed Sep. 30, 2002 and entitled "Communication System Endpoint Device With Integrated Call Synthesis Capability," U.S. Pat. No. 7,031,264, issued Apr. 18, 2006 and entitled "Distributed Monitoring and Analysis System for Network Traffic," and U.S. patent application Ser. No. 10/460,700, filed Jun. 12, 2003 and entitled "Method and Apparatus for Determination of Network Topology," the disclosures of which are incorporated by reference herein.

Although system 100 is shown as including a centralized controller 104 in FIG. 1, this should not be construed as a requirement of the invention. The invention can alternatively be implemented using a distributed monitoring and analysis system as described in the above-cited U.S. Pat. No. 7,031,264, or using a combination of centralized and distributed techniques. In such embodiments, the functions of the controller 104 may be distributed at least in part across one or more of the endpoint devices, and/or associated distributed test units.

The term "controller" as used herein is therefore intended to include a centralized controller, a distributed controller, or a hybrid controller which is at least partially centralized and at least partially distributed.

The endpoint devices 102 may be otherwise conventional wired or wireless IP telephones (including devices commonly referred to as IP "softphones"), personal digital assistants (PDAs), mobile telephones, personal computers (PCs), single-board computers (SBCs) or other types of processing devices, suitably configured for interaction with the controller 104 in providing various functions of the network monitoring and analysis system.

It should be noted that the endpoint devices 102 are each typically configured to operate as both receiver and transmitter, as in the case of a bidirectional VoIP communication established between a given pair of endpoints.

Conventional aspects of such endpoint devices are well-known in the art and therefore not described in further detail herein.

One or more of the endpoint devices 102 may comprise so-called "synthetic" devices which generate test communications in the form of synthesized calls but are not configured for use in placing actual calls. Also, one or more of the endpoint devices may comprise devices suitable for use in placing actual calls and also capable of generating test communications in the form of synthesized calls. Additional details regarding devices of the latter type can be found in the above-cited U.S. patent application Ser. No. 10/261,431.

Additional system elements, not shown in FIG. 1, may be coupled between each of the endpoints 102 and the network 106, or otherwise arranged within the system 100, in accordance with conventional practice.

Network 106 may represent, e.g., a global communication network such as the Internet, a wide area network, a metropolitan area network, a local area network, a wireless cellular network, a public switched telephone network (PSTN), or a satellite network, as well as portions or combinations of these or other communication networks.

The network 106 may comprise conventional IP routers, gateways, switches or other packet processing elements. For example, the network may include a DEFINITY® Enterprise Communication Service (ECS) communication system switch available from Avaya Inc. of Basking Ridge, N.J., USA. Another example call processing switch suitable for use in conjunction with the present invention is the MultiVantage™ communication system switch, also available from Avaya Inc.

Standard protocols that are commonly utilized in VoIP communications include User Datagram Protocol (UDP), described in Internet Engineering Task Force (IETF) Request for Comments (RFC) 768, "User Datagram Protocol," August 1980, http://www.ietfsorg/rfc/rfc768.txt, Real-Time Transport Protocol (RTP), described in IETF RFC 1889, "RTP: A Transport Protocol for Real-Time Applications," http://www.ietf.org/rfc/rfc1889.txt, and RTP Control Protocol (RTCP), described in IETF RFC 3158, "RTP Testing Strategies," August 2001, all of which are hereby incorporated by reference herein.

By way of example, VoIP communications may comprise RTP voice data packets that are sent over an IP network using UDP. More particularly, the RTP packets are encapsulated in UDP packets which are themselves encapsulated in IP packets. Of course, a wide variety of protocols and encapsulation arrangements may be used in implementing the invention.

Signaling protocols utilizable in conjunction with VoIP communications to provide functions such as call setup, teardown and dial tone include Session Initiation Protocol (SIP), described in IETF RFC 3261, "SIP: Session Initiation Protocol," June 2002, http://www.ietf.org/rfc/rfc3261.txt, International Telecommunication Union—Telecommunication Standardization Sector (ITU-T) Recommendation H.323, "Packet-based multimedia communication systems," November 2000, and ITU-T Recommendation H.225, "Call signaling protocols and media stream packetization for packet-based multimedia communication systems," November 2000, all of which are incorporated by reference herein.

VoIP communications or other communications in the context of the present invention may be implemented utilizing one or more of the above-cited protocols, or other suitable protocols, as will be readily apparent to those skilled in the art.

It should be emphasized that the simplified configuration of the system 100 as shown in FIG. 1 is for purposes of illustration only, and should not be construed as limiting the invention to any particular arrangement of elements. For example, the system 100 may include additional endpoints, comprising other types and arrangements of routing elements, switching elements or other types of processing elements.

Figure 2:
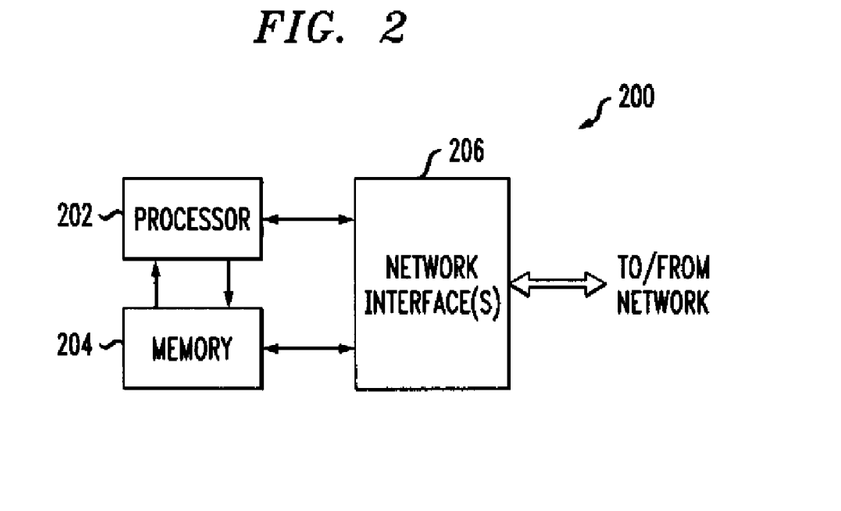
FIG. 2 is a simplified block diagram showing one possible implementation of an endpoint device, controller or other processing element of the FIG. 1 system.

FIG. 2 shows one possible implementation of a given processing element 200 of the FIG. 1 system. The processing element 200 may represent, by way of example, at least a portion of a given one of the endpoint devices 102, at least a portion of the controller 104, or at least a portion of another processing device of the system.

The processing element 200 as shown in the figure includes a processor 202 coupled to a memory 204 and one or more network interfaces 206. The techniques of the present invention may be implemented at least in part in the form of software storable in the memory 204 and executable by the processor 202. The memory 204 may represent random access memory (RAM), read-only memory (ROM), optical or magnetic disk-based storage, or other storage elements, as well as combinations thereof.

Those skilled in the art will recognize that the individual elements of FIG. 2 as shown for illustrative purposes may be combined into or distributed across one or more processing devices, e.g., a microprocessor, an application-specific integrated circuit (ASIC), a computer or other device(s).

The FIG. 2 arrangement is considerably simplified for purposes of illustration. For example, if viewed as representative of a telephony terminal endpoint device, the processing element 200 may include conventional elements typically associated with such a device, such as codecs and other voice signal processing hardware or software elements.

As indicated above, the illustrative embodiment of the invention as implemented in the network-based communication system 100 of FIG. 1 utilizes endpoints 102 and controller 104 to provide a root cause analysis function in a network monitoring and analysis system.

Figure 3:
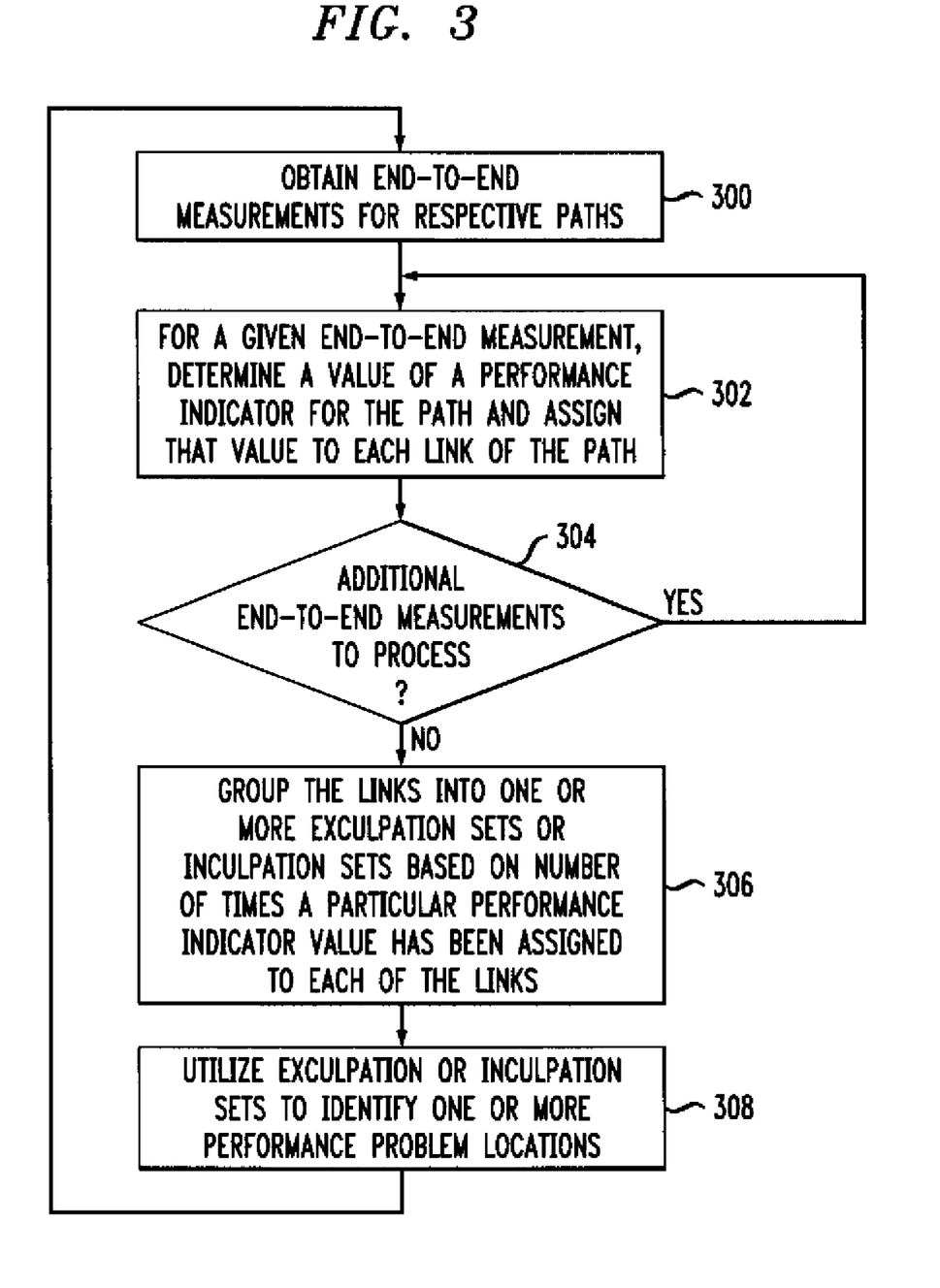
FIG. 3 is a flow diagram of a root cause analysis process of the FIG. 1 system in an illustrative embodiment of the invention.

Referring now to the flow diagram of FIG. 3, an exemplary process flow associated with the root cause analysis function is shown.

In step 300, end-to-end measurements are obtained for respective paths through the network. Each of the paths in this embodiment is assumed to be comprised of multiple links. The measurements may be obtained, by way of example, using techniques such as those disclosed in the above-cited U.S. Patent Application Publication No. 2005/0053009. This approach may involve, for example, selection of an appropriate set of synthetic calls or other communications to be placed in the system 100 in conjunction with the root cause analysis function. The selected calls may be placed, or "exercised," as part of a network assessment operation of the network monitoring and analysis system, with each call generally being placed between a corresponding pair of the endpoint devices 102 of the system 100. The resulting end-to-end measurements comprise measurement data characterizing the selected calls. Numerous other techniques may be used to collect end-to-end measurements, as will be apparent to those skilled in the art. For example, measurement data may be collected at least in part based on actual calls or other communications taking place in the system, rather than synthetic communications.

In step 302, a given end-to-end measurement is processed to determine a value of a performance indicator for the corresponding path, and the resulting indicator value is assigned to each link of the path. In other words, a single performance indicator value is determined for the overall path, and that same performance indicator value is automatically assigned to each link of the path. This is in contrast to approaches that separately determine link-level performance indicators for each link of a path.

Again, any of a number of well-known conventional techniques may be used to determine end-to-end paths and their associated links.

The performance indicator may be, for example, a binary indicator having a first value indicative of adequate performance and a second value indicative of inadequate performance. As more particular examples, the indicator may have a first value indicating "success" and a second value indicating "failure," or a first value indicating "clean" and a second value indicating "problem," and so on.

In step 304, a determination is made as to whether or not there are any additional end-to-end measurements to process. If there are additional measurements to process, the determining and assigning operations of step 302 are repeated for each of the remaining measurements. After all measurements have been processed through the determining and assigning operations of step 302, the process moves to step 306 as indicated.

In step 306, the links are grouped into one or more exculpation sets or inculpation sets, based on how many times a particular performance indicator value has been assigned to each of the links. Many links of the network will be part of multiple paths for which end-to-end measurements have been obtained in step 300. Thus, for each of the links, a count is maintained of the number of times a particular performance indicator value is assigned to that link as a result of the determining and assigning operations of step 302. For example, a given link may be associated with a certain number of path measurements that have the performance indicator value of "success" and other path measurements that have the performance indicator value of "failure." The exculpation or inculpation sets are formed based on such counts. A number of examples of the manner in which such sets are determined will be described in greater detail below.

It should be noted that results of the step 306 may be used to determine if additional measurements are needed. For example, if a given link is determined to be close to an exculpation or inculpation threshold, it may be beneficial to collect further measurement data for that link. This may be achieved by performing additional end-to-end measurements for other paths that include the given link. This process of determining if additional measurements are needed could continue until there are no more borderline cases. As another example, one or more links for which it is determined that there is insufficient measurement data may simply be eliminated from the analysis on that basis alone. Also, the set parameters may be adjusted in an iterative manner to alter the number of set members and eliminate or reduce borderline cases.

As an example, for each link j a success ratio $r_j = s_j/f_j$ may be computed, where $s_j$ is the number of end-to-end measurements that have adequate performance and $f_j$ is the number of end-to-end measurements that do not have adequate performance. A stopping rule can be established which specifies that measurement data will continue to be collected for link j as long as $r_j$ is within the range [x, y]. If $r_j$ reaches x, the measurement collection loop is exited and the link j may be considered a member of the inculpation set. Similarly, if $r_j$ reaches y, the measurement collection loop is exited and the link j may be considered a member of the exculpation set. Possible values for x and y may be 0.1 and 10, respectively, although other values could of course be used. This particular set of values specifies an arrangement in which link j is considered a possible problem source if there are ten times as many failures as successes in end-to-end measurements which involve that link. It is not considered a possible problem source if there are ten times as many failures as successes in the end-to-end measurements which involve that link. For anything in between, the process continues to gather additional measurement data for the "unsettled" link j. More generally, the selection of x, y in the form t, 1/t may be used. These and other values will typically vary depending upon the needs of a given application, but other suitable values can be readily determined by one skilled in the art.

The foregoing approach can also be used to determine an appropriate order in which to make additional end-to-end measurements. For example, utility measures can be determined for proposed additional end-to-end measurements by counting the number of unsettled links which are associated with each of those measurements. The additional measurements would then proceed in order of their respective utilities.

In step 308, the exculpation or inculpation sets are utilized to determine one or more performance problem locations in the network. Other embodiments can be used to determine locations associated with other types of performance conditions. That is, the invention is not limited to use in determining performance problem locations, but can be used for other types of analysis not necessarily involving performance problems, such as feature attribution.

As will be described, an advantage of the above-described process is that it can locate the root cause of inadequate end-to-end performance in the network topology, and can also detect situations where the root cause is not likely to be associated with the network topology. It can be implemented using arbitrary types of measurements, and thus is not limited to additive performance measurements as in other techniques. For example, the process can be implemented using non-additive performance measures such as estimated mean opinion score (EMOS). The process can be readily implemented in a distributed manner within system 100, as was previously described, and consumes only minimal computing resources.

Situations where the root cause is not likely to be associated with the network topology may include, for example, situations in which performance indicators such as software version or intermediate router utilization are used to characterize certain network elements or other portions of the network.

It is to be appreciated that the particular arrangement of processing steps in FIG. 3 is presented by way of illustrative example only. Numerous alternative arrangements of processing steps may be used to determine one or more exculpation or inculpation sets for identifying likely performance problem locations in a network.

Further aspects of the exculpation and inculpation sets of the illustrative embodiment will now be described in greater detail.

A given link may be considered a member of the exculpation set only if it has been involved in a specified minimum number of adequate end-to-end measurements. As a more particular example, the link may be included in the exculpation set if the number of times a performance indicator value of "success" has been assigned to the link in step 302 exceeds the specified minimum number.

A given link may be considered a member of the inculpation set only if it has been involved in a specified minimum number of inadequate end-to-end measurements. As a more particular example, the link may be included in the exculpation set if the number of times a performance indicator value of "failure" has been assigned to the link in step 302 exceeds the specified minimum number.

The specified minimum numbers for determining membership of a given link in the respective exculpation and inculpation sets may be different numbers or the same number. Such numbers may be adjusted in a straightforward manner in order to control the size of the resulting sets. A given embodiment may use, for example, a specified minimum number of one, such that a link involved with at least one adequate end-to-end measurement is considered part of the exculpation set and a link involved with at least one inadequate measurement is considered part of the inculpation set.

In determining the performance problem locations in step 308, one or both of the exculpation set and the inculpation set may be used. For example, the complement of the exculpation set in combination with the inculpation set may be used to identify the likely performance problem locations. Such a combination may be based on determining the union of the two sets. Alternatively, the complement of the exculpation set alone may be used, or the inculpation set alone may be used.

As a more particular example, assume that adequate performance is defined as y>a for a specified adequacy threshold a. An exculpation set $S_c$ may then be defined as the set of links for which each link is involved with at least c adequate end-to-end measurements:

$$j \in S_c \Leftrightarrow \sum_{i \ni y_i > a} L_i^j > c$$

and similarly the inculpation set $T_c$ may be defined as:

$$j \in T_c \Leftrightarrow \sum_{i \ni y_i < a} L_i^j > c,$$

where j denotes a particular link, i denotes a particular end-to-end measurement, and L is the count of adequate end-to-end measurements. As noted above, the number of adequate or inadequate measurements c in a given embodiment may be set equal to one, resulting in an exculpation set $S_1$ and an inculpation set $T_1$. Again, different values of c may be used in determining the respective exculpation and inculpation sets.

The adequacy threshold may be specified in terms of any type of measured quantity, such as, for example, jitter, loss, delay, EMOS or other QoS-related statistics.

As mentioned previously, one or both of the inculpation set and the exculpation set may be used to determine the performance problem locations in step 308 of the FIG. 3 process. For example, one may identify the likely problem links as those links which are not associated with at least one adequate end-to-end measurement. This is the complement of the exculpation set $S_1$ described above. As another example, one could identify the likely problem links as those links which are not associated with at least c adequate end-to-end measurements. This is the complement of the exculpation set $S_c$ described above.

Numerous other techniques may be used to form exculpation and inculpation sets in accordance with the present invention. For example, an exculpation set $S_p$ may comprise those links for which at least p percent of their associated end-to-end measurements were adequate. The complement of the exculpation set $S_p$ identifies those links that do not have at least p percent adequate measurements. A corresponding inculpation set $T_p$ may be defined as comprising those links for which at least p percent of their associated end-to-end measurements were inadequate. Again, different values of the adequacy threshold p may be used in forming the respective exculpation and inculpation sets. Using notation similar to that of the previous example, the exculpation set $S_p$ for this example may be defined as follows:

$$j \in S_p \Leftrightarrow \frac{\sum_{i \ni y_i > a} L_i^j}{\sum_{\forall i} L_i^j} > p$$

and similarly the inculpation set $T_p$ may be defined as:

$$j \in T_p \Leftrightarrow \frac{\sum_{i \ni y_i < a} L_i^j}{\sum_{\forall i} L_i^j} > p,$$

where again j denotes a particular link, i denotes a particular end-to-end measurement, and L is the count of adequate end-to-end measurements.

It should be noted that in the foregoing percentage-based example, the exculpation and inculpation sets are closely related because if p+q=1, $S_p = T_q$. So in that case, the complement of the exculpation set is the same as the inculpation set, and there would be no need to consider both $S_p$ and $T_p$.

The adequacy thresholds c and p in the above examples may be set so as to limit the resulting set of likely problem links to a manageable number. Such links will typically be subject to further investigation, and such investigation may involve a time-consuming process that would depend on the application. Therefore, a user would select c or p so as to limit the set of identified problem links to a reasonably small size.

A number of techniques may be used to order the links that require further investigation. In the foregoing examples, the size of the exculpation sets $S_c$ and $S_p$ will decrease with increasing c or p, as it will become more difficult for a given link to qualify for membership in the sets. Accordingly, the size of the complements of the exculpation sets $S_c$ and $S_p$ will increase with increasing c or p. Similarly, the size of the inculpation sets $T_c$ and $T_p$ will decrease with increasing c or p. Thus, if one is using the complement of the exculpation sets $S_c$ or $S_p$ to identify likely problem links for further investigation, one may start with low values of p or c and then increase the values to reduce the set to a manageable size.

As a more particular example, if the complement of the exculpation set $S_p$ is being used, one may start with p=0 and keep increasing p. As this is done, the complement of the exculpation set $S_p$ will grow. Any new edges that appear with each increase in p can be investigated in the order in which they appear. A similar approach can be used to order the links for investigation using other types of exculpation or inculpation sets.

The determination of the exculpation or inculpation sets may be performed by the controller 104 based on measurement data supplied thereto by the endpoint devices 104. As indicated previously, such a controller may be implemented in a distributed manner using the endpoint devices. As one example of a possible distributed approach, exculpation or inculpation sets may be formed by particular ones of the endpoint devices and then combined with other exculpation or inculpation sets formed by other endpoint devices.

It should be noted that the term "performance condition" as used herein is intended to be construed broadly to encompass a wide range of different network performance problems, network features or other network conditions. In certain of the examples described previously, binary performance indicators based on adequacy thresholds were used. However, the invention does not require the use of these particular types of performance indicators or adequacy thresholds. Other applications of the root cause analysis techniques described herein may involve, for example, performance conditions such as Type of Service (TOS) byte corruption, feature attribution and asymmetric ping attribution. These other applications are intended to be construed as determining causes of network performance conditions as that general term is used herein.

With regard to TOS byte corruption, the proper operation of IP telephony often requires setting up expedited queues in network routers so that RTP streams can take precedence over other types of traffic. The TOS byte of the IP header indicates to the router whether a packet deserves the expedited treatment. Accordingly, IP phones set this byte to the value that elicits the expedited treatment. Some devices corrupt the IP header and set the TOS byte to 0 which means normal treatment. Evidently, such devices can prevent the smooth operation of IP telephony by stopping the expedited treatment of packets in all subsequent routers in the end-to-end path. The root cause analysis techniques described herein can be used to identify the disrupting devices. In this case, a binary performance indicator may be used to express, for example, whether packets marked for expedited treatment at the source arrive at the destination with the same mark for expedited treatment.

In a feature attribution application, noteworthy features can often be observed in a time series of end-to-end measurements. Such features could be, for example, an abrupt change in the level or in the dispersion of traffic, daily periodic patterns and progressions, etc. It is useful to understand the root cause of such features. The techniques described herein can be used to identify the link or links in the network topology to which the feature can be attributed. In this case, a binary performance indicator may be used to express, for example, whether or not a time series of end-to-end measurements display the feature of interest.

With regard to asymmetric ping attribution, a ping from point A to point B generally yields results comparable to a ping from point B to point A. There are devices, such as traffic shapers, that can be configured to treat ICMP echo requests very differently that ICMP echo replies and in such a case, the ping performance will be substantially different. When such an asymmetry is observed, it is useful to locate the traffic shaping devices. The root cause analysis techniques disclose herein can be used to identify the devices that cause the asymmetry. In this case, a binary performance indicator may be used to express, for example, whether the difference between the ping measurements in each of the two directions exceeds the variability expected to be observed on the network.

Again, the above arrangements relating to TOS byte corruption, feature attribution and asymmetric ping attribution are just examples, and there are many other applications of the root cause analysis techniques disclosed herein.

A network monitoring and analysis system with improved root cause analysis as described herein can be implemented as part of or in conjunction with an otherwise conventional VoIP analysis tool or other network management system application that is used, for example, to test, diagnose, troubleshoot or design an Internet telephony system or other type of network-based communication system. An example of a network management system application is the VMON® system from Avaya Inc. of Basking Ridge, N.J., USA.

As previously noted, one or more of the monitoring and analysis functions described above in conjunction with the illustrative embodiments of the invention may be implemented in whole or in part in software utilizing processor 202 and memory 204 associated with a controller or an endpoint device. Other suitable arrangements of hardware, firmware or software may be used to implement the techniques of the invention.

It should again be emphasized that the above-described arrangements are illustrative only. For example, alternative embodiments may involve different controller or endpoint device hardware, firmware or software configurations, different types of network traffic, different types of exculpation or inculpation sets, different types of network performance problems or other network performance conditions, etc. Also, the particular processing steps associated with the root cause analysis in the illustrative embodiments may be varied. Furthermore, the particular assumptions used in the context of describing the illustrative embodiments should not be viewed as requirements of the invention, and embodiments may be constructed in which one or more of these assumptions do not apply. These and numerous other alternative embodiments within the scope of the following claims will be apparent to those skilled in the art.

What is claimed is:

1. A method comprising:
   receiving by a system:
   i. a first end-to-end measurement of a first path in a network that comprises a first plurality of links, and
   ii. a second end-to-end measurement of a second path in the network that comprises a second plurality of links;
   processing by the system:
   i. the first end-to-end measurement to obtain one of a first value and a second value, and
   ii. the second end-to-end measurement to obtain one of the first value and the second value, iii. wherein the first value is indicative of adequate performance and the second value is indicative of inadequate performance;
assigning by the system:
  i. the first value to each link in the first plurality of links after processing the first end-to-end measurement, and
  ii. the second value to each link in the second plurality of links, after processing the second end-to-end measurement;
determining, by the system, whether a link common to both the first plurality of links and the second plurality of links satisfies a range [x, y], wherein x and y are real numbers;
obtaining, by the system, a third end-to-end measurement of a third path in the network that includes the link, wherein the third end-to-end measurement is obtained when the link fails to satisfy the range [x, y] after assigning the first value and the second value;
grouping, by the system, the link into at least one of a first group and a second group based on the third end-to-end measurement satisfying the range [x, y]; and
identifying, by the system, a network problem based on at least one of the first group and the second group.

2. The method of claim 1 wherein obtaining the third end-to-end measurement of the third path further comprises the task of:
processing, by the system, the third end-to-end measurement, wherein the first value is obtained as a result of processing the third end-to-end measurement; and
assigning, by the system, the first value to the link after processing the third end-to-end measurement, wherein the link is in:
  i. the first path,
  ii. the second path, and
  iii. the third path.

3. The method of claim 2 wherein the link is grouped into the first group when the link satisfies the range x; and
wherein the link satisfies the range x after assigning the first value to the link based on the third end-to-end measurement.

4. The method of claim 3 wherein grouping the link into the first group indicates that the link has n times as many adequate performance than inadequate performance in end-to-end measurements that include the link, and wherein n is a real number.

5. The method of claim 2 wherein the task of assigning comprises incrementing a counter each time the first value is assigned to the link.

6. The method of claim 5 wherein the link is grouped into the first group when the counter satisfies the range x.

7. The method of claim 1 further comprising:
adjusting the range [x, y] to control whether the link is grouped into at least one of the first group and the second group.

8. The method of claim 1 wherein obtaining the third end-to-end measurement of the third path further comprises the task of:
processing, by the system, the third end-to-end measurement, wherein the second value is obtained as a result of processing the third end-to-end measurement; and
assigning, by the system, the second value to the link after processing the third end-to-end measurement, wherein the link is in:
  i. the first path,
  ii. the second path, and
  iii. the third path.

9. The method of claim 8 wherein the link is grouped into the second group when the link satisfies the range y; and
wherein the link satisfies the range y after assigning the second value to the link based on the third end-to-end measurement.

10. The method of claim 9 wherein grouping the link into the second group indicates that the link has n times as many inadequate performance than adequate performance in end-to-end measurements that include the link, and wherein n is a real number.

11. The method of claim 8 wherein the task of assigning comprises incrementing a counter each time the second value is assigned to the link.

12. The method of claim 11 wherein the link is grouped into the second group when the counter satisfies the range y.

13. The method of claim 8 further comprising:
adjusting the range [x, y] before processing the second value based on the third end-to-end measurement, wherein the link is grouped into the second group after:
  i. adjusting the range [x, y], and
  ii. assigning the second value to the link based on the third end-to-end measurement.

14. The method of claim 1, wherein the network problem is identified by the system based on a complement of the first group.

15. The method of claim 1, wherein the network problem is identified by the system based on a complement of the second group.

16. The method of claim 1, wherein the network problem is identified by the system based on a combination of the second group and a complement of the first group.

17. The method of claim 1, wherein the network problem is identified by the system based on a union of the first group and the second group.

18. The method of claim 1 wherein the first end-to-end measurement, the second end-to-end measurement, and the third end-to-end measurement are obtained from Voice over Internet Protocol (VOIP) communications between endpoint devices in the network.

19. A method comprising:
collecting, by a system, end-to-end measurements for a plurality of paths that comprises one or more links j;
computing, by the system, a ratio $r_j = s_j/f_j$ for the one or more links j, wherein:
  i. $s_j$ is the number of end-to-end measurements that have adequate performance, and
  ii. $f_j$ is the number of end-to-end measurements that have inadequate performance;
establishing, by the system, a range [x, y] for collecting end-to-end measurements, wherein:
  i. the one or more links j have inadequate performance when $r_j = x$, and
  ii. the one or more links j have adequate performance when $r_j = y$; and
identifying, by the system, a network problem based on the ratio $r_j = s_j/f_j$;
wherein j, $s_j$, and $f_j$ are positive integers; and
wherein $r_j$, x, and v are real numbers.

20. The method of claim 19 wherein the system ceases to collect end-to-end measurements when $r_j = x$.

21. The method of claim 19 wherein the system ceases to collect end-to-end measurements when $r_j = y$.

* * * * *